United States Patent
Terry, III (12)

(10) Patent No.: US 8,182,676 B2
(45) Date of Patent: May 22, 2012

(54) WASTEWATER EFFLUENT FILTER CASE WITH GAS BAFFLE

(75) Inventor: Theophilus B. Terry, III, Somerville, TN (US)

(73) Assignee: Bear Onsite, LLC, Somerville, TN (US)

( * ) Notice: Subject to any disclaimer, the term of this patent is extended or adjusted under 35 U.S.C. 154(b) by 348 days.

(21) Appl. No.: 12/537,818

(22) Filed: Aug. 7, 2009

(65) Prior Publication Data

US 2011/0031175 A1 Feb. 10, 2011

(51) Int. Cl.
*C02F 1/00* (2006.01)
*C02F 1/20* (2006.01)
*B01D 21/00* (2006.01)
*B01D 21/24* (2006.01)
*B01D 35/30* (2006.01)
*B01D 29/00* (2006.01)

(52) U.S. Cl. ............... 210/170.08; 210/172.1; 210/306; 210/188; 210/420; 210/456; 210/532.2; 210/539

(58) Field of Classification Search ............. 210/170.08, 210/172.2, 306, 188, 420, 456, 532.2, 539
See application file for complete search history.

(56) References Cited

U.S. PATENT DOCUMENTS

| | | | |
|---|---|---|---|
| 4,634,525 A | 1/1987 | Yant | |
| 4,832,846 A | 5/1989 | Gavin | |
| 4,959,145 A | 9/1990 | Meyers | |
| 5,413,706 A | 5/1995 | Graves | |
| 5,584,993 A | 12/1996 | Van Der Schrieck | |
| 5,593,584 A | 1/1997 | Nurse, Jr. | |
| D386,241 S | 11/1997 | Nurse, Jr. | |
| 5,683,577 A | 11/1997 | Nurse, Jr. | |
| 5,736,035 A | 4/1998 | Nurse, Jr. | |
| 5,779,896 A * | 7/1998 | Nurse, Jr. | ......... 210/299 |
| D402,349 S | 12/1998 | Gavin | |
| 5,871,640 A | 2/1999 | Gavin | |
| 6,015,488 A | 1/2000 | Gavin | |
| D431,629 S | 10/2000 | Meyers | |
| 6,129,837 A | 10/2000 | Nurse, Jr. | |
| 6,136,190 A | 10/2000 | Zoeller et al. | |
| 6,200,470 B1 * | 3/2001 | Romero et al. | ......... 210/170.06 |
| 6,231,762 B1 * | 5/2001 | Marshall, III | ......... 210/234 |
| 6,234,200 B1 | 5/2001 | Hall | |
| 6,319,403 B1 | 11/2001 | Meyers | |
| 6,331,247 B1 | 12/2001 | Zoeller et al. | |
| 6,338,797 B1 | 1/2002 | Nurse, Jr. et al. | |
| 6,360,898 B1 | 3/2002 | Nurse, Jr. et al. | |
| 6,478,957 B1 | 11/2002 | Terry, III et al. | |
| 6,495,040 B1 | 12/2002 | Zoeller et al. | |
| 6,540,912 B1 | 4/2003 | Nurse, Jr. et al. | |
| D483,836 S | 12/2003 | Nurse, Jr. et al. | |
| 6,749,367 B1 | 6/2004 | Terry, III | |
| 6,749,743 B1 | 6/2004 | Terry, III | |
| 6,772,789 B1 | 8/2004 | Terry, III et al. | |

(Continued)

*Primary Examiner* — Benjamin Kurtz
(74) *Attorney, Agent, or Firm* — Middleton Reutlinger; Chad D. Bruggeman; John F. Salazar (57) ABSTRACT

A gas baffle for a waste water treatment plant filter housing that includes a first and second deflecting plate. The gas baffle has at least one flow-through opening defined by the first and second deflecting plates. The combination of the first and second deflecting plates deflects rising gas bubbles and any solid particulates so that the bubbles and particulates do not enter the filter housing. The gas baffle may include exterior apertures to dissipate the rising gas bubbles that travel on the bottom surface of each deflecting plate. The gas baffle may be integrally formed with the filter housing or created separately and subsequently connected.

19 Claims, 6 Drawing Sheets

U.S. PATENT DOCUMENTS

| | | |
|---|---|---|
| 6,841,066 B2 | 1/2005 | Nurse, Jr. et al. |
| 6,890,433 B2 | 5/2005 | Nurse, Jr. et al. |
| 6,942,796 B2 * | 9/2005 | Lacasse et al. ............... 210/316 |
| 7,160,460 B2 | 1/2007 | Terry, III |
| 7,309,419 B2 | 12/2007 | Rhorer et al. |
| 2007/0084781 A1 | 4/2007 | Hornback et al. |

* cited by examiner

WASTEWATER EFFLUENT FILTER CASE WITH GAS BAFFLE

TECHNICAL FIELD

The present invention relates to a gas baffle device for use in the effluent outlet of a waste water treatment plant.

DETAILED DESCRIPTION

Waste water treatment plants and particularly septic tanks are provided with effluent outlets which discharge the effluent from the septic tanks into leach fields. In order to obtain proper operation of the leach or drain fields, it is important to prevent solid particulates from leaving the tank with the effluent. However, in the fermentation process in a septic tank, upwardly rising gas bubbles created by this fermentation process may carry with them solid particulate material. As these gas bubbles rise within the multiple layers of sludge and liquid in the septic tank, particulate materials encapsulated with the gas bubbles rise to the top of the tank and therefore may be emitted into the leach field with the effluent. In order to minimize the amount of solid particulates entering the leach fields, the gas baffle embodiments of the invention prevent the influx of rising gas bubbles into the outlet discharge line.

Figure 1:
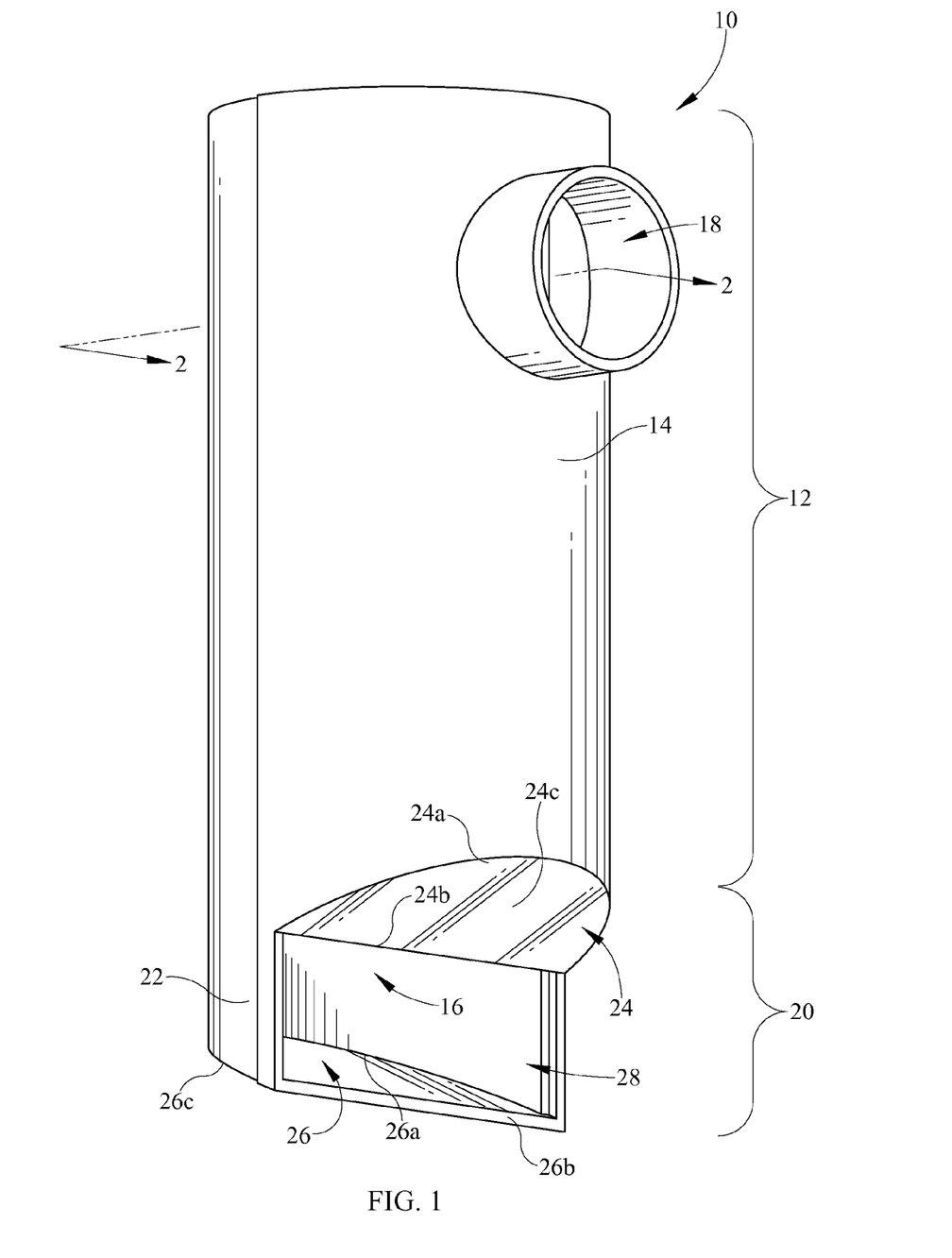
FIG. 1 is a bottom perspective view of the integral filter housing and gas baffle apparatus according to one embodiment.
Figure 2:
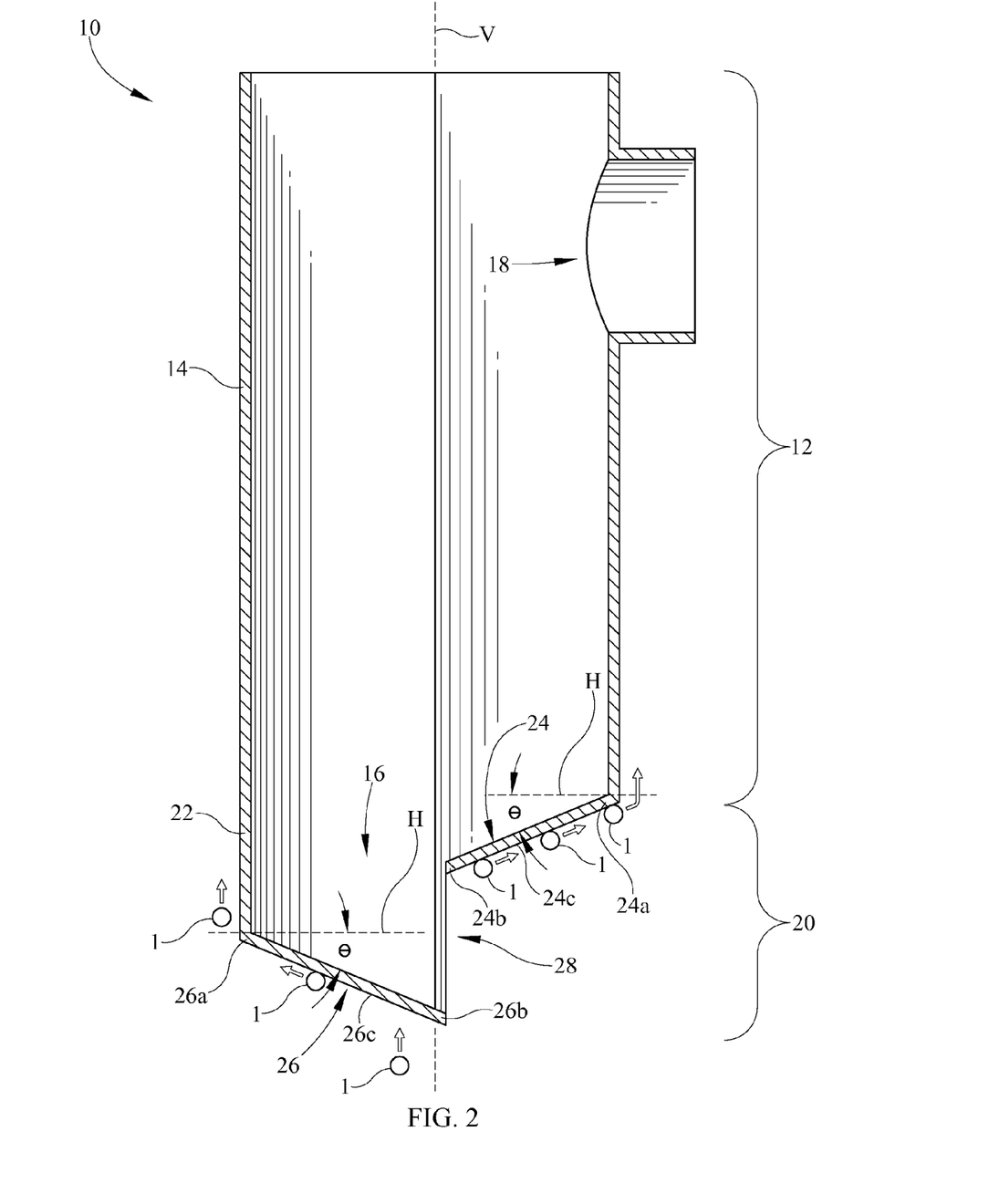
FIG. 2 is a sectional view of the integral filter housing and gas baffle apparatus of FIG. 1 taken along line 2-2.

As shown in FIGS. 1-2, the effluent outlet assembly 10 includes the outlet tee 12 which is provided with a vertical housing 14 having a fluid inlet end or bottom opening 16 and an outlet opening 18. A gas baffle apparatus 20 is inserted or integrally formed with the fluid inlet end 16 of the housing 14 whereby the gas bubbles bubbling up through the septic tank are deflected annularly outward, and away from the inlet to the vertical housing portion 14.

As shown in FIGS. 1 and 2, the gas baffle 20 includes a housing 22 wall with a plurality of deflecting or baffle plates 24 and 26 deflecting the flow of gas bubbles outwardly, and away from the inlet to the housing 14. Gas baffle 20 is provided with at least a first and second deflecting plate, respectively 24 and 26, extending downwardly and inwardly away from the housing wall 22. Thus, each deflecting plate is transversely angled from the vertical axis V of the housing wall 22. As shown in FIG. 2, the angle θ is preferably about 20 degrees from the horizontal axis H (horizontal axis H is perpendicular to the vertical axis V), but may be any acute angle. Although, it is shown that each deflecting plate has the same angle θ from the horizontal, it should be understood that the angle of either plate 24, 26 may be varied from the other. Respectively, each deflecting plate 24 and 26 has an outer peripheral edge 24a and 26a adjacent the housing wall 22 and a free edge 24b and 26b positioned at the downward termination end of each deflecting plate. The respective first and second deflecting plates 24 and 26 are positioned on opposing sides of the baffle housing 22, with the first deflecting plate 24 being vertically spaced away from second deflecting plate 26. The free edges 24b and 26b of the deflecting plates define a flow-though opening 28 of the gas baffle 20. Flow-through opening 28 is shown as being substantially vertical, but can be a variety of other shapes, sizes, quantities, and construction. It can be seen from FIG. 2, the combination of the two deflecting plates extend across the cross-section of the housing 22 adjacent the inlet end 16 and act to deflect the flow of gas bubbles 1 away from opening 28. Accordingly in operation, any solid particulate carried by the upwardly rising gas bubbles 1 is also deflected away from the opening 28 of the fluid inlet end 16. Specifically, the upwardly rising gas bubbles will contact the bottom surface 24c, 26c of either deflecting plate 24, 26 and generally move along those surfaces to the outer peripheral edge 24a, 26a until the gas bubbles 1 can freely escape vertically adjacent the outside of the vertical housing 14. In this manner, the gas bubbles 1 and any associated particulate are prevented from entering the fluid inlet end 16 of the outlet tee 12.

Assembly 10 may be made from a variety of material not limited to plastic, metal, or combinations thereof. Although the gas baffle 20 is shown as being integrally formed with the outlet tee housing 14, it should be understood that the gas baffle 20 and outlet tee 12 may be made as separate pieces and then suitably joined depending on what they are made of by a variety of mechanical attachments such as friction fit or chemical adhesives. Therefore, the integral gas baffle apparatus 20 and outlet tee 12 may be readily installed in a new septic tank, or alternatively the gas baffle apparatus could be used to retrofit an existing outlet tee already present in a septic tank. The gas baffle apparatus 20 itself may be of a unitary construction or fabricated from separate components.

Figure 3:
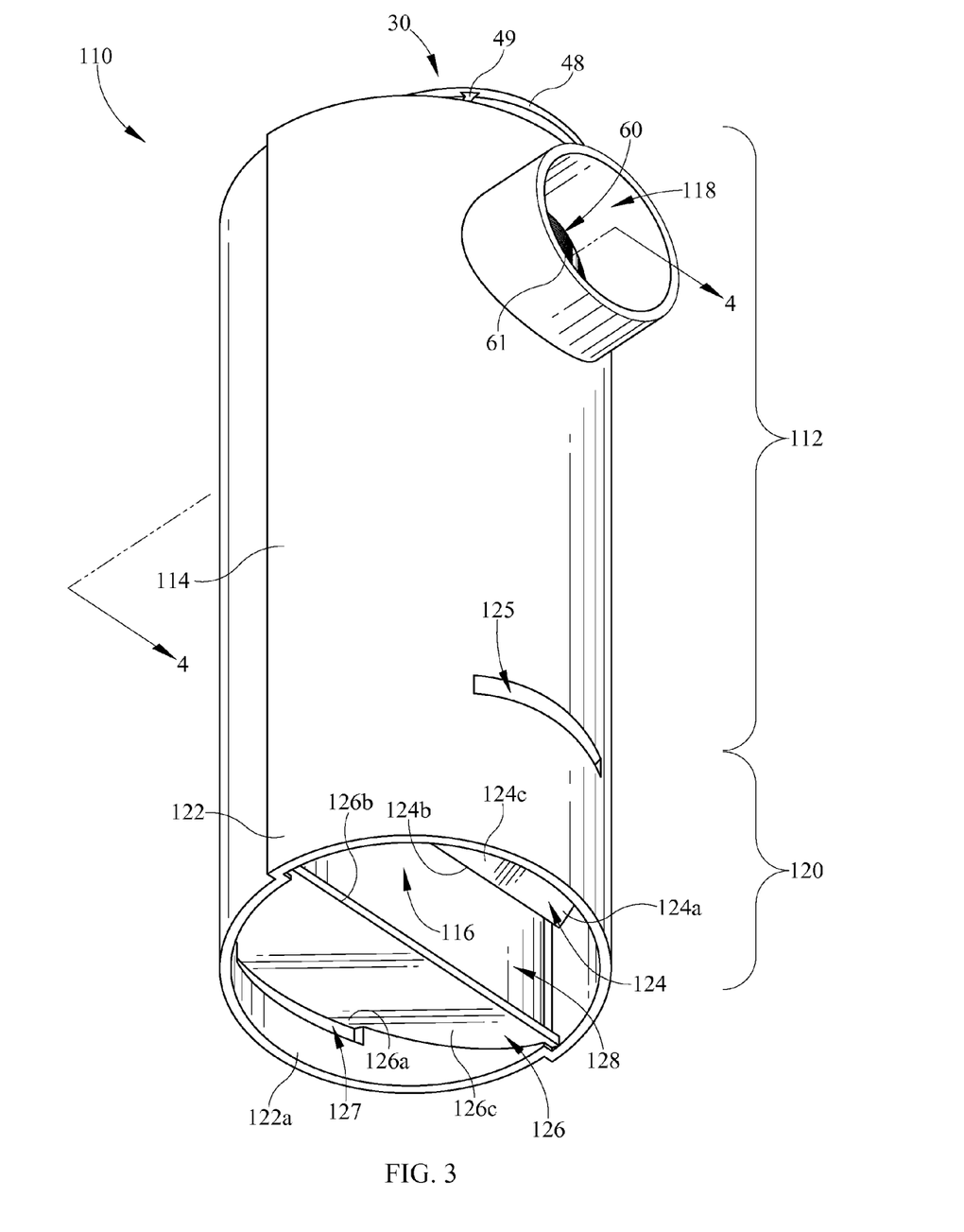
FIG. 3 is a bottom perspective view of the integral filter housing and gas baffle apparatus according to another embodiment of the invention with a filter disposed therein.
Figure 4:
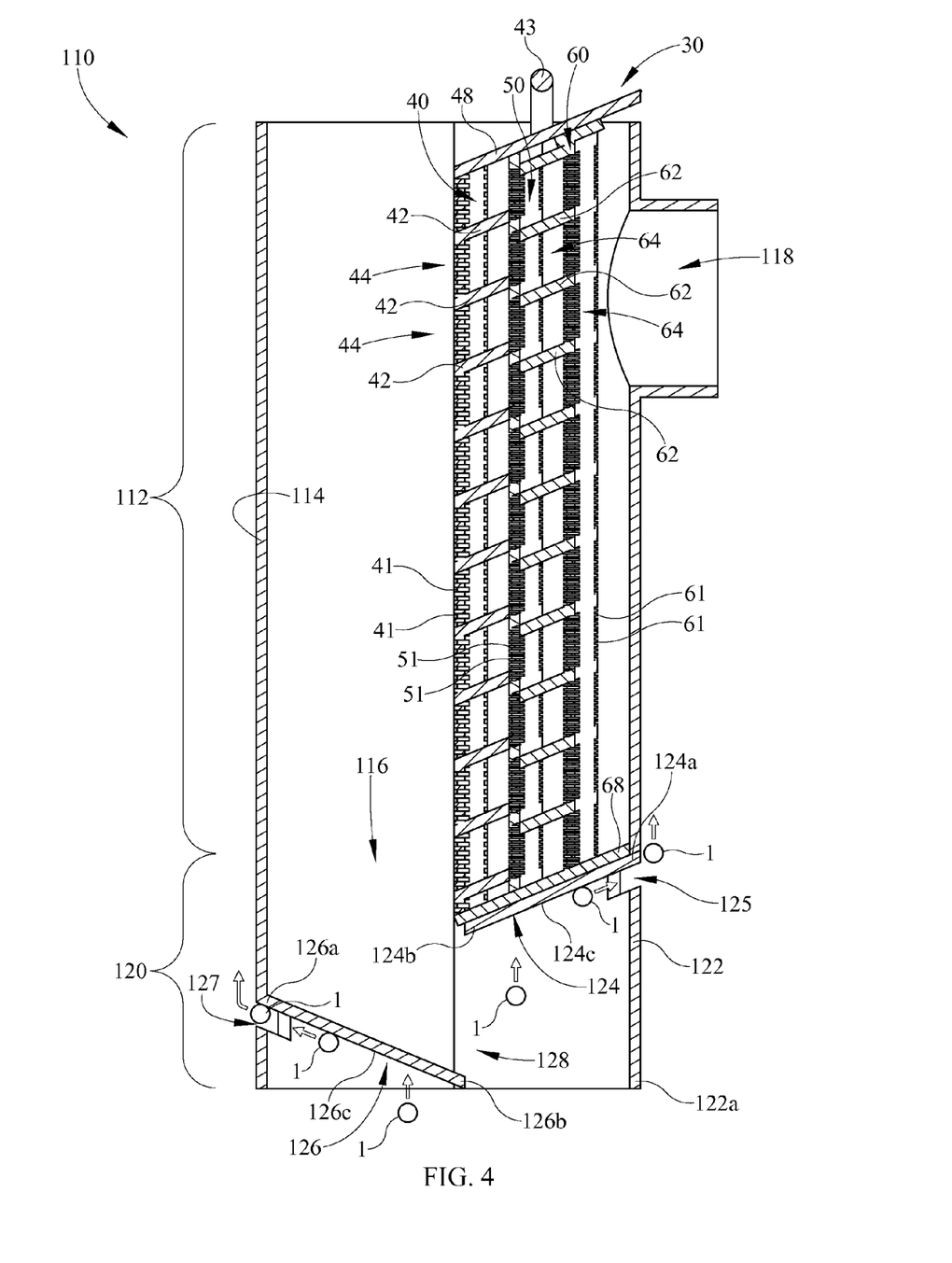
FIG. 4 is a sectional view of the integral filter housing and gas baffle apparatus of FIG. 3 with a filter disposed therein taken along line 4-4.

As shown in FIGS. 3 and 4, another embodiment of an effluent outlet assembly 110 includes a gas baffle 120 that may be used with a vertical housing 114 of an outlet tee 112. The first and second deflecting plates 124 and 126 of baffle housing 122 are spaced from a distal end 122a of the gas baffle housing 122 or integral outlet tee housing 114. Respectively, at least one aperture 125 and 127 is provided adjacent a bottom angled surface 124c and 126c respectively of the first deflecting plate 124 and the second deflecting plate 126. As shown in FIG. 4, the apertures 125 and 127 are respectively proximate the outer peripheral edge 124a and 126a of the transverse deflecting plates 124 and 126. In operation as best shown in FIG. 4, the first and second deflecting plates 124 and 126 and distal end 122a of the gas baffle housing 122 cooperate to trap and deflect the rising air bubbles 1 with any particulates they may carry annularly outward along the bottom angled surface 124c and 126c of each deflecting plate until air bubbles reach the apertures 125 and 127. There the gas bubbles 1 are free to pass through the apertures 125 and 127 and away from the baffle housing 122 or distal end 122a, so that any particulates carried by the bubbles flow outside of the housing 122 and 114 walls. The gas bubbles 1 are thus directed away from the flow-through opening 128, which is defined by deflecting plate free edges 124b and 126b. The gas baffle 120 is in flow communication with the fluid inlet end 116 and outlet opening 118 of the outlet tee. The provision of the housing wall distal end 122a of the effluent outlet assembly 110 may be used to facilitate vertical stacking or orientation when handling, displaying, or packaging the assembly.

As shown in FIGS. 3 and 4, the vertical housing 114 of outlet tee 112 may also include a filter or filter cartridge 30 with a plurality of flow-through apertures for filtering out solids and particulates in the effluent passing through the outlet tee. The size of the apertures will define the smallest particles of solids or particulates that may pass through the filter. It should be understood that a variety of filters may be used in combination with the apparatus embodiments of the present invention, but one embodiment of the filter 30 can be seen in FIGS. 3-6. The filter 30 is received within outlet tee 112 and is provided generally with a plurality of vertical plates, such as plates 40, 50, and 60, interconnected in a horizontal stacking relationship. Although the vertical plates may be arranged in any combination of two or more vertical plates, the embodiment shown in the Figures is provided with three vertical plates: a front plate 40, a middle plate 50, and a back plate 60. In operation, an effluent flow enters through the gas baffle 120 into the fluid inlet end 116 of the outlet tee 112, and flows through the filter 30 such that only an effluent having a predefined solid or particulate characteristic moves through the filter and out the outlet opening 118 of the outlet tee 112.

Figure 5:
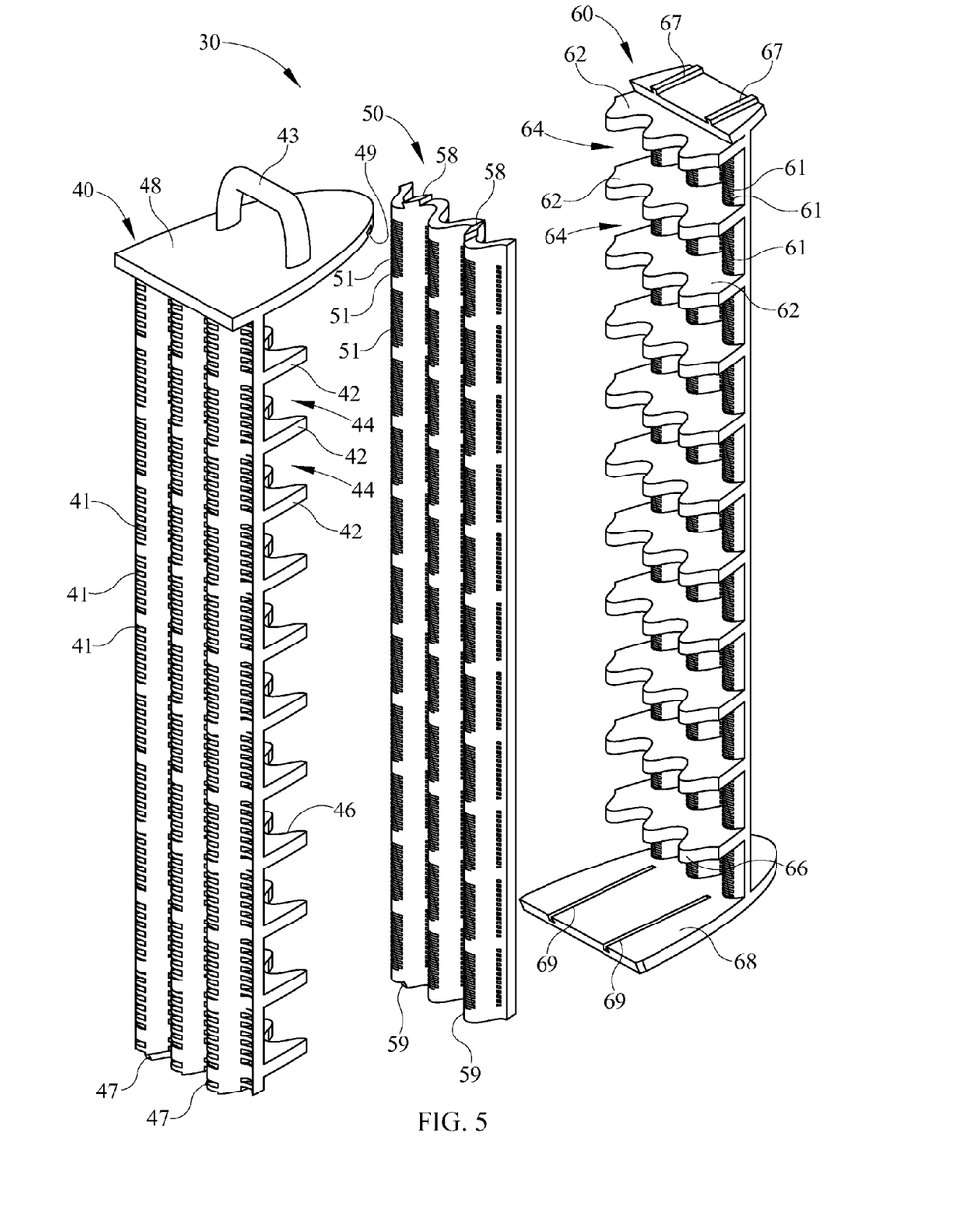
FIG. 5 is a top perspective view of the filter of FIG. 4 with each component exploded away from the others.
Figure 6:
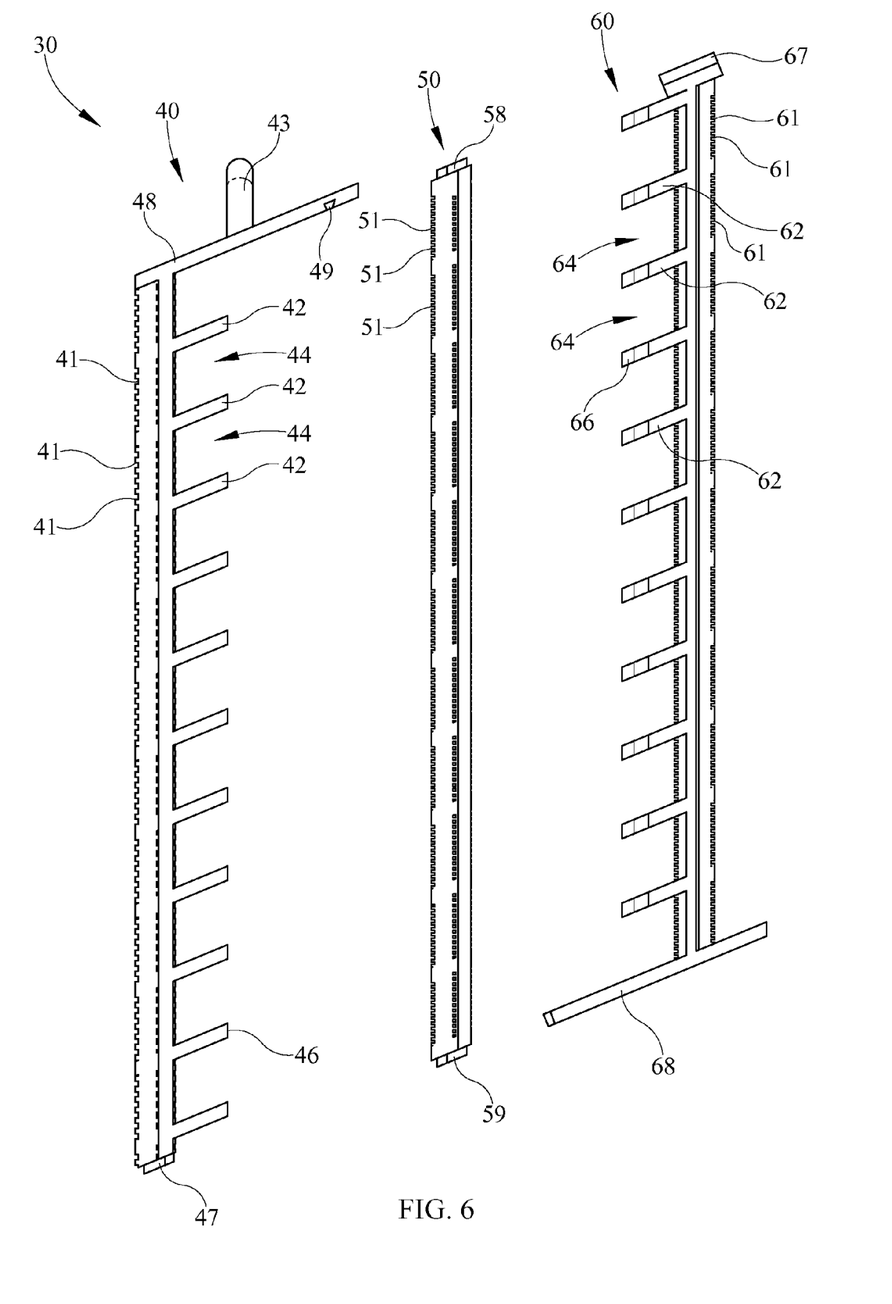
FIG. 6 is a side view of the filter of FIG. 5 with each component exploded away from the others.

As shown in FIGS. 4-6, the vertical plates 40, 50, and 60 are horizontally separated at a predefined distance due to one or more lateral projections engaging adjacent vertical plates. However, vertical plates 40, 50, and 60 may be separated at a predefined distance without the use of lateral projections. For example, end plates 48 and 68 may position the vertical plates relative to each other. In the embodiment shown, front plate projections 42 extend to and engage the middle plate 50 and back plate projections 62 extend to and engage the middle plate 50. Adjacent lateral projections of a single plate, such as projections 42 of front plate 40, are spaced at a predefined vertical distance and define a substantially horizontal tier 44 though which effluent passes. In the same manner, projections 62 of back plate 60 creates substantially horizontal tiers 64. Therefore, between adjacent vertical plates 40, 50, and 60 there may exist a single tier, or multiple horizontal tiers as shown in the figures. A pair of adjacent substantially horizontal tiers 44 and 64 is in fluid communication with the one or more apertures 41, 51, and 61 of each vertical plate allowing effluent flow to pass consecutively through adjacent areas of the front, middle and back plates and thereby through the filter 30. Alternatively, a single horizontal tier can exist between a pair of adjacent vertical plates of a two vertical plate filter. It is further shown in the embodiment of FIGS. 4 and 6 that the lateral projections 42 and 62 are transverse to the vertical axis of their respective plate 40 and 60. Adjacent horizontal tiers 44 and 64 are specifically shown in FIG. 4 as being angled upwardly at a transverse angle to the vertical axis of the vertical plates and unaligned as a result of the angled and unaligned projections 42 and 62, however they may be orthogonal or aligned. As such, the tiers 44 and 64 are each transversely positioned relative to the vertically extending filter and vertically offset relative to each other. Although the lateral projections are specifically shown to extend from their respective vertical plates, the lateral projections may be a variety of different sizes, quantities, construction, and positions such as extending from any one or multiple vertical plates, or extend through adjacent plates, and still provide for a substantially horizontal tier. As shown in FIGS. 4-6, a vertical plate or multiple vertical plates such as 40, 50, and 60 may be serpentine in shape. In such a case, the lateral projections 42 and 62 may have serpentine edges 46 and 66 to contour to the adjacent faces of center plate 50.

As shown in FIGS. 4-6 and described above, the apertures 41, 51, and 61 of each vertical plate allow effluent to flow laterally through each respective vertical plate 40, 50, and 60 and out the filter 30. Preferably, the dimension of the one or more apertures of the adjacent areas of each vertical plate becomes progressively smaller, such that the filtration becomes greater as liquid passes through each successive vertical plate. This allows for particles larger than the respective aperture to become trapped and allow fluid to continue through the filter and ultimately exit the filter. For instance, the one or more apertures 41 of front plate 40 are positioned proximate each horizontal tier 44 and may be about $3/16$ inches in size. The one or more apertures 51 of the middle plate 50 may be $1/8$ inches in size. The one or more apertures 61 of the back plate 60 may be $1/16$ inches in size. As such, a two vertical plate filter may be successively sized for a $1/8$ inch to a $1/16$ inch aperture progression. However, the one or more apertures of each vertical plate 40, 50, and 60 may be provided in a variety of sizes, including the same size, and in a variety of quantities, construction, and shapes and still filter the effluent. Although it is not shown, the lateral projections 42 and 62 of the vertical plates, alone or in combination with the apertures described above, may have apertures as well, or create gaps when combined with additional vertical plates, to filter particles vertically through the filter.

As shown in FIGS. 3-6, filter 30 may have a filter end cap or end plate 48 and 68 positioned on the vertical distal ends of the filter. The top end cap 48 may project from the front plate 40 and extend across the middle plate 50 and back plate 60. The top end cap 48 may be provided with a pair of dovetail slots 49 to receive the dovetail projections 58 and 67 from each of the middle and back plates 50 and 60. The top end cap 48 may also have a handle 43. In the same manner, the bottom end cap 68 projects from the bottom distal end of the back plate 60 and substantially extends over the middle plate 50 and front plate 40. The bottom end cap 68 includes dovetail slots 69 to receive the dovetail projections 59 and 47 of each of the middle and front plates 50 and 40. Therefore, the top and bottom end caps 48 and 68 may be used to substantially close the distal ends of the filter 30. Also, the bottom end cap 68 and top end cap 48 are shown as being substantially transverse relative to the substantially vertical axis of the vertical plates. The bottom end cap 68 may mate with and back up the first deflecting plate 124 of the gas baffle 120 as shown in FIG. 4. Alternatively, the bottom end cap 68 of the filter could be used in place of the deflecting plate 124 to deflect the gas bubbles or used in combination with the deflecting plates of the gas baffle to deflect the gas bubbles. Additionally, the end cap 68 may be releasably secured to the first deflecting plate 124 or outlet tee by a variety of mechanical attachments or adhesives to position the filter within the outlet tee. It should be understood that the vertical plates 40, 50, and 60 of the filter 30 may be combined by means of a variety of mechanical attachments or chemical adhesives and still be either fixedly or releasably secured to each other. For example, the middle plate could be held in place only by compression between the outer opposing vertical plates.

It is understood that while certain embodiments of the invention have been illustrated and described, it is not limited thereto except insofar as such limitations are included in the following claims and allowable functional equivalents thereof

I claim:

1. An outlet tee of an effluent outlet assembly for a septic tank having a gas baffle comprising:

an outlet tee having a substantially vertical housing with an inlet bottom opening and an outlet opening;

a gas baffle disposed about said inlet bottom opening of said outlet tee, said gas baffle having a gas baffle housing with a first baffle plate and a second baffle plate disposed adjacent said inlet bottom opening, each one of said first baffle plate and said second baffle plates include a bottom surface, said first baffle plate being vertically spaced from said second baffle plate, said first baffle plate being positioned at a first angle relative to said gas baffle housing thereby said first gas baffle plate downwardly angles relative to said gas baffle housing away from said inlet bottom opening to deflect rising gas bubbles up one side of said outlet tee and away from said inlet bottom opening, and said second baffle plate being positioned at a second angle relative to said gas baffle housing thereby said second gas baffle plate downwardly angles relative to said gas baffle housing away from said inlet bottom opening to deflect rising gas bubbles up a second side of said outlet tee and away from said inlet bottom opening; and said gas baffle housing having a first aperture and a second aperture, wherein said first aperture extends through said gas baffle housing and said bottom surface of said first baffle plate is continuous with an upper edge of said first aperture, and wherein said second aperture extends through said gas baffle housing and said bottom surface of said second baffle plate is continuous with an upper edge of said second aperture.

2. The outlet tee as in claim 1 wherein each of said first baffle plate and said second baffle plate have an outer peripheral edge projecting inwardly from said outlet tee housing.

3. The outlet tee as in claim 1 wherein said first angle relative to the horizontal axis is the same as said second angle.

4. The outlet tee as in claim 1 wherein said outlet tee housing having a distal end extending vertically past each of said first baffle plate and said second baffle plate.

5. The outlet tee as in claim 1 wherein said first baffle plate is laterally opposed from said second baffle plate within said inlet bottom opening of said inlet tee housing.

6. An outlet tee having a gas baffle comprising:
an outlet tee having a substantially vertical housing with an inlet bottom opening and an outlet opening;
a first baffle plate and a second baffle plate disposed adjacent said inlet bottom opening of said outlet tee, said first baffle plate being vertically spaced from said second baffle plate, said first baffle plate extending downwardly at a first angle relative to said housing to deflect rising gas bubbles away from said inlet bottom opening, and said second baffle plate extending downwardly at a second angle relative to said housing to deflect rising gas bubbles away from said inlet bottom opening;
each one of said first baffle plate and said second baffle plate having an outer peripheral edge and an inner free edge, each one of said first baffle plate and said second baffle plate extends inwardly from said housing at said outer peripheral edge towards said inner free edge;
said housing having a first aperture positioned below said first baffle plate, wherein said outer peripheral edge of said first baffle plate is substantially integral with said first aperture thereby rising gas bubbles deflect along said first baffle plate to pass directly through said first aperture;
said housing having a second aperture positioned below said second baffle plate, wherein said outer peripheral edge of said second baffle plate is substantially integral with said second aperture thereby rising gas bubbles deflect along said second baffle plate to pass directly through said second aperture; and
at least one flow-through opening defined by each said inner free edge of each one of said first baffle plate and said second baffle plate.

7. The outlet tee as in claim 6 wherein said at least one flow-through opening is substantially vertical.

8. The outlet tee as in claim 6 wherein said housing of said outlet tee having a distal end extending vertically past each of said first baffle plate and said second baffle plate.

9. The outlet tee as in claim 6 wherein a bottom surface of said first baffle plate is continuous with an upper edge of said first aperture and a bottom surface of said second baffle plate is continuous with an upper edge of said second aperture.

10. The outlet tee as in claim 6 further including a filter.

11. The outlet tee as in claim 6 wherein said first angle relative to the horizontal axis is the same as said second angle.

12. The outlet tee as in claim 6 wherein said housing is an elongated tubular member.

13. An outlet tee gas baffle comprising:
a gas baffle apparatus having a substantially vertical housing within an open upper end and an open bottom end, said housing having a first interior baffle plate and a second interior baffle plate, wherein said first baffle plate being vertically spaced from said second baffle plate, said first baffle plate extending downwardly at a first angle relative to said housing to deflect rising gas bubbles from passing vertically through said gas baffle, and said second baffle plate extending downwardly at a second angle relative to said housing to deflect rising gas bubbles from passing vertically through said gas baffle;
each one of said first baffle plate and said second baffle plate having an outer peripheral edge and an inner free edge, each one of said first baffle plate and said second baffle plate extends inwardly from said housing at said outer peripheral edge towards said inner free edge;
said gas baffle housing having a first aperture positioned below said first baffle plate, wherein said outer peripheral edge of said first baffle plate is substantially integral with said first aperture thereby rising gas bubbles deflect along said first baffle plate to pass directly through said first aperture and outside said gas baffle housing;
said gas baffle housing having a second aperture positioned below said second baffle plate, wherein said outer peripheral edge of said second baffle plate is substantially integral with said second aperture thereby rising gas bubbles deflect along said second baffle plate to pass directly through said second aperture and outside said gas baffle housing; and
at least one flow-through opening defined by each said inner free edge of each one of said first baffle plate and said second baffle plate.

14. The outlet tee gas baffle as in claim 13 further including a filter housing having an inlet bottom opening and an outlet therein and in fluid communication with said at least one flow-through opening of said gas baffle.

15. The outlet tee gas baffle as in claim 14 further including a filter.

16. The outlet tee gas baffle as in claim 15 wherein said filter engages said first baffle plate.

17. The outlet tee gas baffle as in claim 13 wherein said first angle relative to the horizontal axis is the same as said second angle.

18. The outlet tee gas baffle as in claim 13 wherein said gas baffle housing has a distal end extending vertically past each of said first baffle plate and said second baffle plate.

19. The outlet tee gas baffle as in claim 13 wherein a bottom surface of said first baffle plate is continuous with an upper edge of said first aperture and a bottom surface of said second baffle plate is continuous with an upper edge of said second aperture.

* * * * *